Patented June 19, 1945

2,378,536

UNITED STATES PATENT OFFICE 2,378,536

NEW VINYL POLYMER AND PROCESS FOR ITS PRODUCTION

Merlin Martin Brubaker, Wilmington, Del., assignor to E. I. du Pont de Nemours & Company, Wilmington, Del., a corporation of Delaware No Drawing. Application November 16, 1940, Serial No. 365,943

7 Claims. (Cl. 260—79)

This invention relates to synthetic polymers and more particularly to a new type of vinyl polymer. This case is a continuation-in-part of application Serial No. 269,075, filed April 21, 1939.

This invention has as its object the preparation of certain new and useful compounds. Another object is to provide a process for the preparation of such compounds. Still another object is the preparation of new vinyl compounds. Other objects will be apparent from the following description of the invention.

These and other objects appearing hereinafter are accomplished by subjecting a polyvinyl thiol ester to hydrolysis, thus producing a polyvinyl thiol.

The following example sets forth a certain well defined instance of the application of this invention. It is, however, not to be considered a limitation thereof since many modifications may be made without departing from the spirit and scope of this invention.

Example I

Fifteen parts by weight of polyvinyl thiol acetate was suspended in 200 parts by weight of a 10% sodium hydroxide solution in methanol and this suspension was allowed to stand at room temperature until the polymer went into solution. This required about 3 days. The resulting solution was then acidified with acetic acid to give a gelatinous precipitate which could be redissolved in alkali and reprecipitated by means of acid. The reprecipitated material was carefully washed and dried, in the absence of oxygen, to give an amorphous solid which was infusible and insoluble in water and organic solvents but soluble in alkali. The product was analyzed for sulfur and found to contain 52.96%; 52.83%. The calculated sulfur content of polyvinyl thiol is 53.34%.

In place of sodium hydroxide alkali or alkaline earth metal hydroxides may be used to catalyze the hydrolysis of the polyvinyl esters. Alternatively, hydrolysis may be carried out with an acid, particularly a mineral acid such as hydrochloric acid.

When alkali or alkaline earth metal hydroxides are used to hydrolyze the polyvinyl thiol esters, the hydroxide is preferably used in the ratio of about 2 to 10 mols per vinyl thiol ester unit present. If less is used, the hydroxide is neutralized by the acid formed and the hydrolysis becomes very slow. When the hydrolysis is carried out in the presence of acid, the amount of catalyst employed may conveniently be from 1 to 10% on the weight of the vinyl thiol ester present. Under some conditions alumina may be used to catalyze the hydrolysis. Neither acids nor alumina are as convenient for hydrolysis, however, as the alkali metal or alkaline earth metal hydroxides because the polyvinyl thiol precipitates as it is formed when the acidic or weakly alkaline media are employed.

Methanol is a convenient solvent for sodium or potassium hydroxides, but other solvents may be used. It is also possible to dissolve the polyvinyl thiol ester in a solvent such as acetone, dioxane, etc., and add the required amount of catalyst to the solution. The concentration of catalyst or of polymer may be varied widely but it is most convenient to use from 5 to 25% solutions. More dilute solutions waste solvent, and more concentrated solutions make the removal of by-products more difficult.

When an alkaline catalyst in alcohol is used, the polyvinyl thiol formed goes into solution as the sodium salt and must be precipitated with an acidic reagent. Any convenient acidic reagent such as acetic acid, formic acid, hydrochloric acid, sulfuric acid, etc., may be used as the precipitant.

The precipitated polyvinyl thiol must be washed if the hydrolysis by-products are to be completely removed. In many cases this is conviently done by agitation and centrifugation with successive quantities of water or alcohol. Since the polyvinyl thiol is soluble only in alkali, any non-alkaline solvent which will dissolve the acid and the salt formed in the hydrolysis may be used. Hydrolysis may be accelerated by using elevated temperatures, but temperatures above 30° to 40° C. cause some discoloration of the polymer, particularly in the presence of strong alkalis. Acidic solutions may conveniently be refluxed. The time required to complete the hydrolysis will depend upon the temperature at which the reaction is carried out, being shorter for higher temperatures.

During the hydrolysis, washing, and drying of polyvinyl thiol it is desirable to keep an inert atmosphere over the polymer so as to avoid degradation through oxidation.

Polyvinyl thiol may be obtained from any of its esters by hydrolysis. The preparation of such esters is fully disclosed in my copending application Serial No. 269,075, filed April 21, 1939. It is generally preferred to prepare the vinyl thiol esters by pyrolysis of 2-mercaptoethanol esters of mono- and di-carboxylic acids. Examples of suitable carboxylic acids are propionic, butyric, valeric, chloroacetic, lactic, benzoic, toluic, naphthoic, furoic, and quinolinic. The esters may be readily prepared by any method well known to the art; e. g., by the action of the corresponding acid, acid halide or anhydride on 2-mercapto-ethanol by standard procedures.

The best temperatures for carrying out the pyrolysis depend to some extent upon the particular ester used and also upon such factors as the nature of the reaction vessel and rate of passage of the ester through the reaction vessel. Generally, temperatures in the range of 300° to 700° C. may be employed but it is preferred to operate in the range of 450° to 500° C. The process may be operated as a continuous operation, in which case the vinyl thiol ester is separated from the reaction product and the unconverted ester recycled. The pressure need not be atmospheric, but in the case of the higher esters it may be desirable to use reduced pressures, and in the case of lower esters it may be better to use pressures greater than atmospheric. It is generally preferred to pyrolyze in the presence of a carrier material such as carbon dioxide, nitrogen, or acetic acid.

The monomeric vinyl thiol esters obtained by pyrolysis may then be polymerized to the polymeric esters. This may be accomplished by carrying out the polymerization reaction in the presence of a polymerization catalyst such as benzoyl peroxide, boron trifluoride, hydrogen peroxide, urea peroxide, lauroyl peroxide, succinic peroxide or the like. The polymerization reaction may also be carried out in the absence of a catalyst or in the presence of such catalysts as metal halides such as ferric chloride, zinc chloride, copper chloride, calcium chloride, etc. Temperatures used for the polymerization may range from room temperature to 120° C.

The vinyl thiol ester may be interpolymerized with a polymerizable organic compound having the radical

in which one of the bonds is satisfied by hydrogen or a monovalent hydrocarbon radical and the other valence by halogen, ether oxygen or sulfur or a radical containing a covalent carbon atom which is separated from the vinyl or vinylidene carbon by not more than one chain atom. Examples of suitable compounds are vinyl chloride, vinyl acetate, acrylic and methacrylic acids and their esters; e. g., methyl, ethyl, propyl, octyl, dodecyl, etc., styrene; chloro-2-butadiene-1,3; butadiene-1,3; vinyl succinimide; vinyl phthalimide, etc. Other compounds which may be interpolymerized, however, are allyl aluminate, dimethallyl borate, etc.

When the hydrolysis reaction is carried out on interpolymerization products an interpolymer of polyvinyl thiol is obtained.

Polyvinyl thiol may be oxidized by air or oxygen or other oxidizing agents as shown by the following examples.

*Example II*

Fifty parts of an alkaline methanol solution containing about 1.8 parts of poly vinyl thiol was put in a flask and oxygen bubbled into the mixture at room temperature for about 15 minutes. A gelatinous material was formed very quickly. It was filtered off, washed carefully with water, and allowed to dry. The product was infusible and insoluble in alkali. This material was a polyvinyl disulfide made by the oxidation of polyvinyl thiol.

Stronger oxidations of polyvinyl thiol gives polyvinyl sulfonic acid as shown below.

*Example III*

Ten parts of polyvinyl disulfide was treated with an excess of 60% nitric acid at about 50° C. for 2 hours. After the disulfide had all dissolved, additional water was added, and the nitric acid was then removed by steam distillation in vacuum. This treatment was repeated and the product finally evaporated in a vacuum desiccator for several days. The product was a sticky, slightly yellow mass which was highly hygroscopic and insoluble in organic solvents.

*Example IV*

The process of Example III was repeated using milder oxidation conditions. A product was obtained which could be precipitated from a concentrated aqueous solution by the addition of alcohol. This product was an amorphous white powder which had a saponification equivalent of 857, whereas the calculated value was 108, indicating that only a small part of the sulfur had been oxidized to a sulfonic acid in this example. The product of the stronger oxidation reaction of Example III was, of course, oxidized to a greater extent.

*Example V*

Eighty-four parts of polyvinyl thiol acetate was treated directly with 800 parts of 60% nitric acid. The reaction was fairly vigorous and the reaction mixture was cooled with ice. The reaction was over in about an hour and the mixture was then heated at 65° C. for ½ hour. The excess nitric acid was removed by distillation in vacuum and the polyvinyl sulfonic acid obtained as before. Strong oxidation of interpolymers containing polyvinyl thiol or polyvinyl thiol acetate may be used to prepare an interpolymer containing polyvinyl sulfonic acid.

Polyvinyl thiol is of use primarily as an insolubilizing agent in other resins. In this application the polyvinyl thiol is thoroughly mixed with a film forming resin or material such as a phenol-formaldehyde or urea-formaldehyde resin, or drying oil-polyhydric alcohol-polycarboxylic acid resin, or cellulose derivative, etc. and the resulting mixture formed into a film, tube, ribbon, or shaped article. The product thus prepared when exposed to atmospheric oxygen will oxidize to a hard, insoluble, infusible solid.

Polyvinyl thiol is also of use as an insolubilizing material in interpolymers; thus, the vinyl thiol ester may be interpolymerized in some other material, the interpolymer hydrolyzed, and formed into a film, tube, ribbon, or shaped article and the product oxidized to render it hard and inert to the common reagents.

It is apparent that many widely different embodiments of this invention may be made without departing from the scope and spirit thereof and therefore it is not intended to be limited except as indicated in the appended claims.

I claim:

1. The process which comprises subjecting a polyvinyl thiol ester to hydrolysis.

2. The process which comprises reacting a polyvinyl thiol ester with alkali present in an amount sufficient to hydrolyze the polyvinyl thiol ester acidifying the resulting product, and recovering a polyvinyl thiol.

3. The process in accordance with claim 2 characterized in that the polyvinyl thiol ester is polyvinyl thiol acetate.

4. The process which comprises subjecting a polyvinyl thiol ester to hydrolysis in the presence of an acid whereby polyvinyl thiol is obtained.

5. The process which comprises subjecting an interpolymerization product of a vinyl thiol ester with a polymerizable organic compound having the radical

to hydrolysis.

6. A polyvinyl thiol.

7. An interpolymer of the hypothetic vinyl thiol with a polymerizable organic compound having the radical

MERLIN MARTIN BRUBAKER.